Oct. 11, 1932.  E. G. BUSSE  1,882,207
RAILWAY TRUCK STRUCTURE
Filed Sept. 29, 1930  3 Sheets-Sheet 2
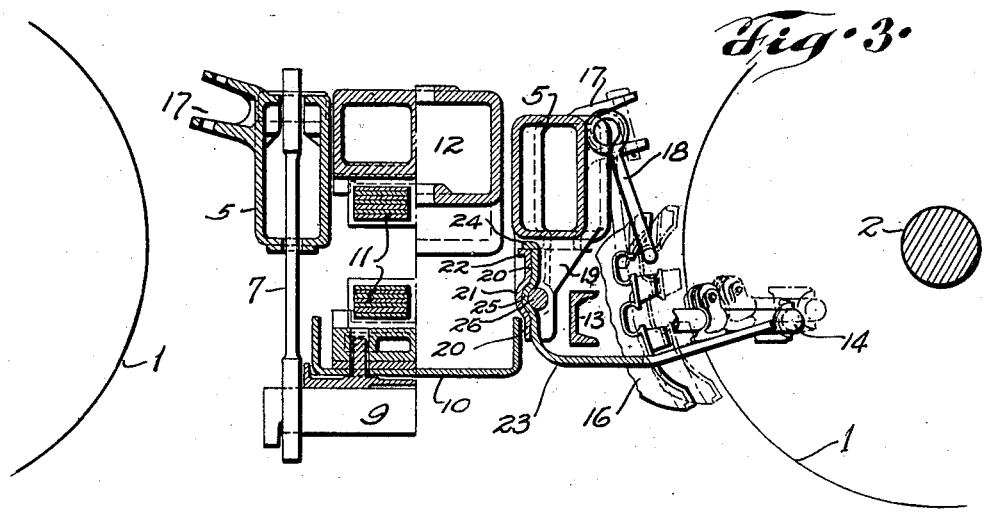
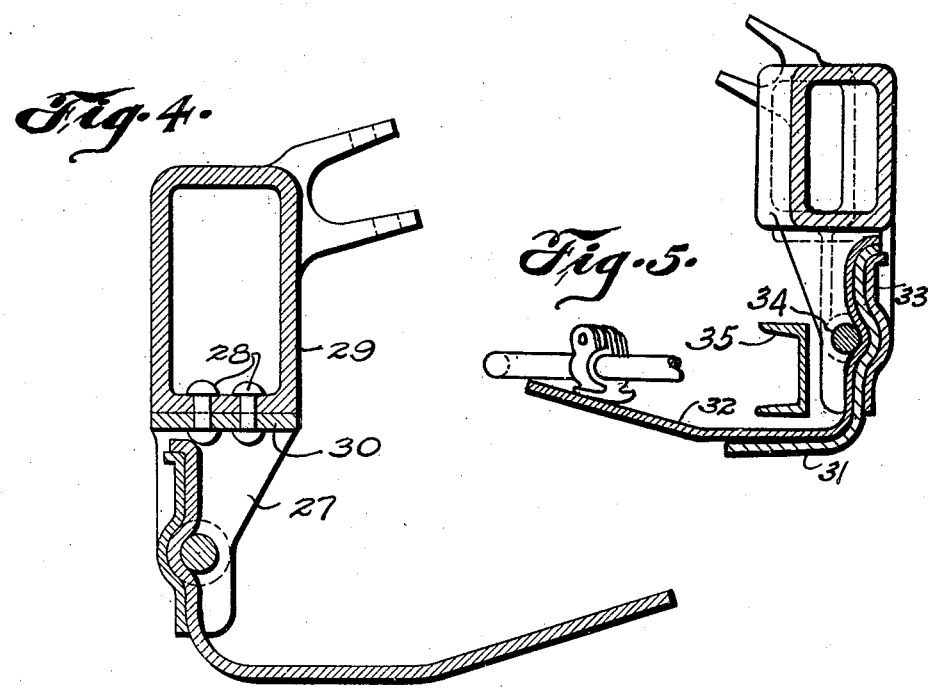
Inventor
Edwin G. Busse
By Rodney Bedell
Attorney Oct. 11, 1932.　　　E. G. BUSSE　　　1,882,207
RAILWAY TRUCK STRUCTURE
Filed Sept. 29, 1930　　3 Sheets-Sheet 3
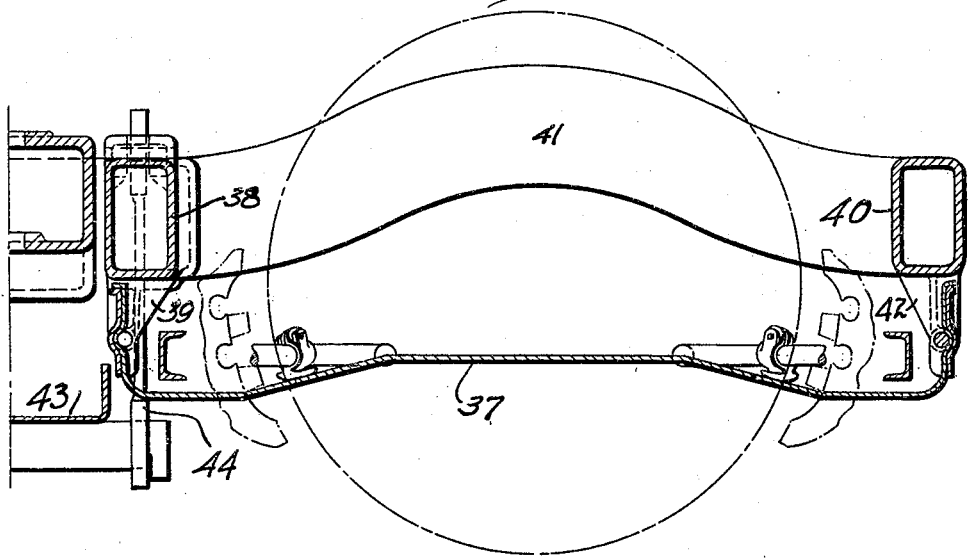
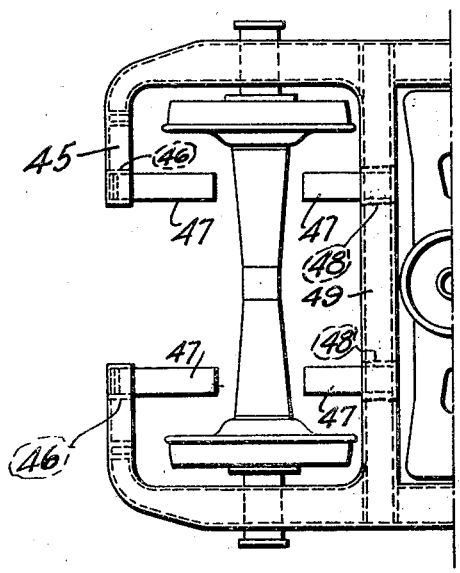
Inventor
Edwin G. Busse
By Rodney Bedell
Attorney Patented Oct. 11, 1932

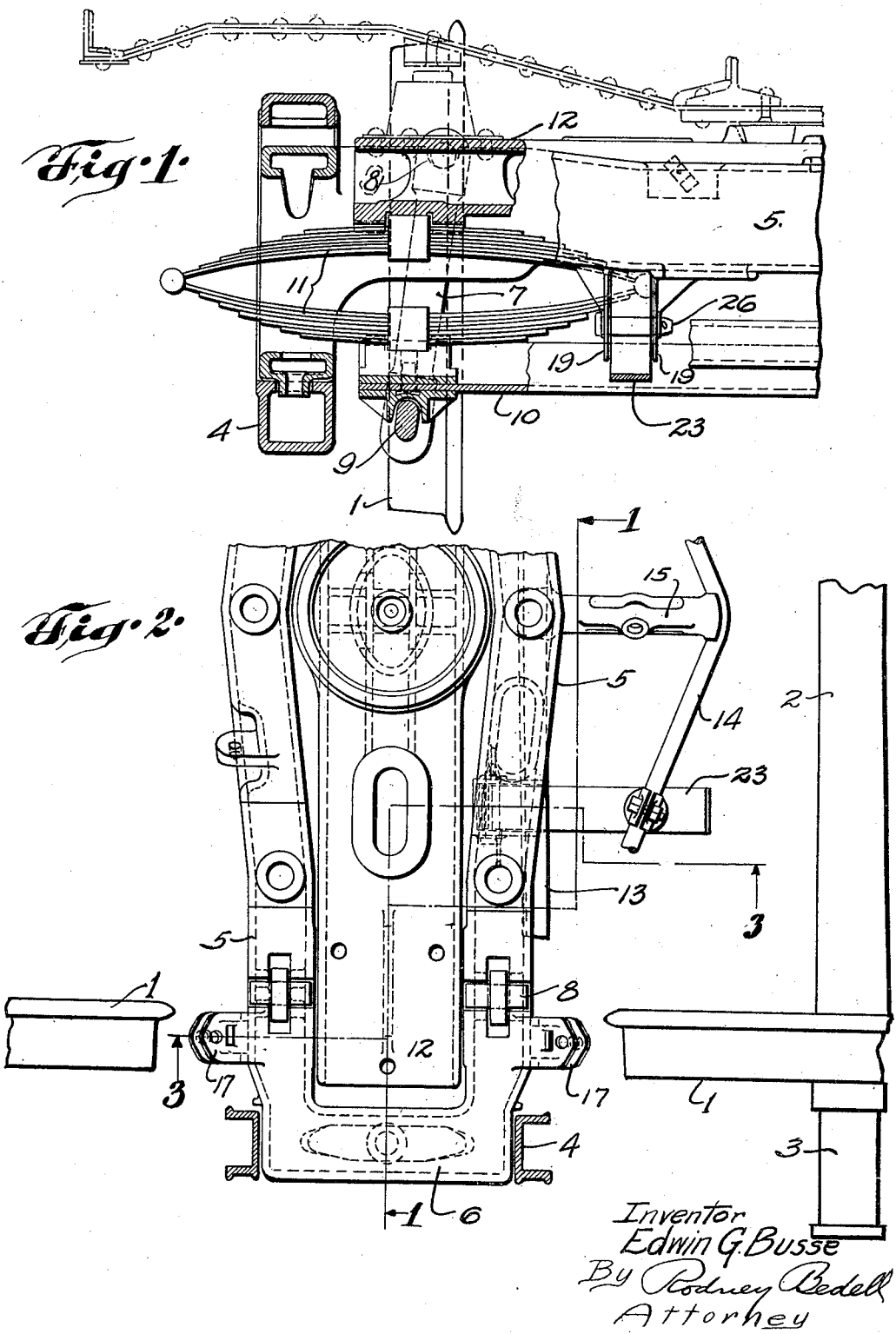

1,882,207

UNITED STATES PATENT OFFICE

EDWIN G. BUSSE, OF CHICAGO, ILLINOIS, ASSIGNOR TO CHICAGO RAILWAY EQUIPMENT COMPANY, OF CHICAGO, ILLINOIS, A CORPORATION OF ILLINOIS

RAILWAY TRUCK STRUCTURE

Application filed September 29, 1930. Serial No. 485,206.

My invention relates to railway rolling stock and consists in all of the novel features described herein and illustrated in the accompanying drawings and particularly in the manner of mounting a third or fourth point guard, guide, or supporting member for the brake beam.

It has long been customary to attach the brake beam guard, guide, or support member to the truck spring plank which is suspended by swinging links from the truck transoms or other part of the truck frame and in order to provide for the movement of the spring plank in relation to the brake beam, which is hung directly from the truck transom or frame, it has been necessary to make the supporting member very broad, or to broaden the shoe or other engaging element on the beam, or to provide broad plates on the supporting member to prevent the brake beam from working off of the supporting member.

The main object of the present invention is to avoid the necessity of such provision and I attain this object by mounting the supporting member on a truck transom whereby relative movement transversely of the truck between the brake beam and the supporting member is eliminated.

Another object of my invention is to avoid the attachment of brackets to the spring plank for mounting the supporting member.

Another object of my invention is to facilitate the application and removal of the supporting member to and from the remainder of the truck structure.

Another object of my invention is to provide the support mounting bracket as an integral part of the truck structure and thereby eliminate the necessity of supplying a separate bracket and elements for securing it to the truck.

These and other detail objects of my invention are attained in the structure illustrated in the accompanying illustrations in which Figure 1 is a vertical transverse section through a car truck and is taken substantially on the line 1—1 of Figure 2.

Figure 2 is a top view of the structure shown in Figure 1.

Figure 3 is a vertical longitudinal section taken on the line 3—3 of Figure 2.

Figure 4 is a corresponding section of a detail of a modified form of my invention.

Figure 5 is a similar section illustrating another modification.

Figure 6 is a longitudinal section through an end of a truck embodying another modification.

Figure 7 is a top view of a truck end showing another modification.

The truck indicated is of the usual four-wheel type including wheels 1, axles 2, with journals 3 which support the truck side frames 4 through the usual journal boxes (not shown). Transoms 5 are are shown as united at their ends by the member 6 and mounted as a unit in the side frames 4, but these transoms may be formed integrally with the side frames if desired. Swing links 7 are suspended from the transoms by pins 8 and carry a cross bar 9 which supports the channel spring plank 10 mounting the elliptic spring 11 which carries the truck bolster 12. This arrangement provides for lateral movement of the truck bolster to relieve the side thrust on the frame journal boxes, journals, and wheel flanges arising from curvatures in the track or unevenness in the rails.

The brake beam indicated is of the usual truss type comprising a compression member 13, a tension member 14, and a strut 15. The beam mounts the usual brake head 16 at each end and the head and beam are suspended from brackets 17, formed on transoms 5, by means of links 18.

All of the above described structure is old and of itself does not constitute my invention.

Depending from the lower side of each box shaped transom 5 is a bracket including sides or legs 19 and seat elements 20 connecting legs 19 and preferably having between them a depression 21. The upper edge of element 20 is spaced from the upper end of the bracket and preferably flanged as indicated at 22 to provide a supporting ledge. The bracket is substantially an inverted U shaped structure with the bottom wall of the transom forming the cross bar of the U.

A bar 23 includes a vertical portion and a horizontal portion, the vertical portion terminating in a lip 24 resting on the top of the flange 22 and the vertical portion also includes an offset or corrugation 25 adapted to fit into the depression 21 in the bracket. The horizontal portion of the bar extends transversely of the transom beneath the brake beam and forms a guard, or guide, or support for the brake beam.

The pin 26 engages the offset 25 and holds it nested in the depression 21, the pin being seated in openings provided in the sides 19 of the bracket.

Preferably, but not necessarily, member 23 is of spring material and is somewhat distorted when assembled, as shown in Figure 3, to prevent rattling in its mounting, and also provides elastic support for the brake beam.

I have shown the brackets arranged for fourth point supports, but it will be understood that the transom could be provided with a single bracket at the center of the truck for mounting a third point support.

Figure 4 illustrates a modified structure in which the inverted U shaped bracket 27 is formed separately from the transom 29 and secured thereto by rivets 28 through its bar 30. Otherwise, the structure illustrated in Figure 4 is the same as that shown in Figure 3.

In the modification illustrated in Figure 5, two elements 31 and 32 are seated between the bracket web 33 and the pin 34. Element 32 corresponds to the element 23 previously described and element 31 constitutes a second guard or support member of heavier section with its lower portion extending under the compression member 35 of the beam and normally spaced below element 32. Element 31 may be rigid or of spring material, although spring material is desired. Element 32 will function alone under ordinary conditions or light loads and element 31 will reinforce and cooperate with element 32 when heavier loads are applied to the brake beam.

My invention is not limited in its application to the center transoms of the truck, but may be applied to the end transoms or end rails of the truck frame and may be used with clasp brakes.

Figure 6 illustrates such an application of my invention, including a brake beam guard, guide, or support member 37 having both of its end portions turned up similar to the supported end of the other forms of my invention illustrated. The bolster transom 38 corresponds to the transom illustrated in Figures 1 to 3 and includes a depending bracket 39. The truck end rail 40 connecting the wheel pieces 41, as shown, is provided with a depending bracket 42 corresponding to the bracket 39 on the bolster transom.

The member 37 may be of rigid or spring material and is rigidly supported at both ends from truck frame elements which have no relative movement. The member is free from any displacement from the desired position, which might otherwise result if it were secured at one end to the spring plank 43 in the usual manner, the spring plank being carried from the truck frame by the swinging links 44.

In Figure 7, I illustrate another arrangement of a guard, guide, or support member for clasp brakes in which the truck end members 45 do not extend clear across the truck frame but project inwardly far enough to provide a depending bracket 46 similar to bracket 42 shown in Figure 6. Separate support members 47 are mounted on each of the brackets 46 and each of the corresponding brackets 48, which will depend from the bolster transom 49. This structure is very similar to that shown in Figure 6, but substitutes separate support members 47 for the continuous support member 37.

Obviously, other variations in details of structure may be made without departing from the spirit of my invention and I contemplate the exclusive use of those variations which come within the scope of my claims.

I claim—

1. A bracket for mounting a brake beam guard, guide, or support member on a railway truck transom and comprising spaced legs for receiving such a member between them, and a leg connecting element for supporting said member, said legs including seats for a member securing pin.

2. A bracket for mounting a brake beam guard, guide, or support member on a railway truck transom and comprising an inverted U shape structure with its bar arranged for receiving elements for attaching the bracket to a transom and with its legs arranged to receive such a member between them and also to receive a detachable holding pin for said member, and with seats for engaging the face of said member, said seats extending between the legs of the bracket.

3. A bracket for mounting a brake beam guard, guide, or support member on a railway truck transom and comprising an inverted U shape structure with its bar arranged for receiving elements for attaching the bracket to a transom and with its legs arranged to receive such a member between them and also to receive a detachable holding pin for said member, and with seats for engaging the face of said member, said seats extending between the legs of the bracket and spaced from its bar to provide a member supporting ledge.

4. In combination, a railway truck transom, a brake beam guard, guide, or support member, and means for mounting said member on said transom so as to distort the mounted portion of said member from its normal shape to prevent rattling.

5. In combination, a railway truck transom, a bracket thereon, and a brake beam guard, guide, or support member on said bracket and arranged to extend beneath a brake beam suspended from said transom.

6. In combination, a railway truck transom, a brake hanger suspended therefrom, a brake head and beam carried by said hanger, and a brake beam guard, guide, or support member mounted on said transom and extending beneath said beam.

7. In combination, a railway truck transom and a brake beam guard, guide, or support member fixedly mounted on said transom and arranged to extend beneath a brake beam suspended from said transom.

8. In combination, a railway truck transom, a bracket depending therefrom, and a bar secured to said bracket and extending downwardly from said transom and then transversely of and away from said transom to form a brake beam guard, guide, or support member.

9. In combination, a railway truck transom, a bracket thereon comprising spaced legs and spaced seats between said legs, a brake beam guard, guide, or support member having a portion in contact with said seats, and a holding element mounted in said legs and bearing on said portion between said seats to hold said member against rattling.

10. In combination, a railway truck transom, a bracket thereon comprising spaced legs and spaced seats between said legs and connected by a depressed section, a brake beam guard, guide, or support member having a portion in contact with said seats and including an intermediate offset part, and a holding element mounted in said legs and engaging said offset part to seat it in said depressed section to hold said member against rattling.

11. In a railway truck, spaced axles with journals, side frames carried on said journals, a transom connecting said side frames between said axles, and a brake beam guard, guide, or support member mounted on said transom and extending therefrom lengthwise of the truck.

12. In a railway truck, spaced axles with journals, side frames carried on said journals, a transom connecting said side frames between said axles, and a member having a supported portion secured to said transom and having a yielding portion extending outwardly therefrom to form a brake beam guard, guide, or support.

13. In a railway truck, side frames, transoms connecting said side frames, swing links depending from said transoms, a spring plank carried by said links, brake beams suspended from said transoms, brake beam guard, guide, or support member secured to said transoms and extending downwardly therefrom between said spring plank and said brake beams and then extending horizontally beneath said brake beams.

14. A brake beam guard, guide, or support member of L shape, the upward portion of which is arranged to be secured to a truck transom and the horizontal portion of which is arranged to extend under a brake beam.

15. A brake beam guard, guide, or support member comprising a horizontal portion to extend under the brake beam and an upright portion having a horizontal corrugation for cooperating with a corresponding depression in a truck transom to prevent the member and transom from rattling.

16. A brake beam guard, guide, or support member comprising a horizontal portion to extend under the brake beam and an upright portion terminating in a horizontal flange whereby the member may be supported upon a suitable truck transom element.

17. A brake beam guard, guide, or support member comprising a horizontal portion to extend under the brake beam and an upright portion terminating in a horizontal flange whereby the member may be supported upon a suitable truck transom element and having a horizontal corrugation for cooperating with a corresponding depression in a truck transom to prevent the transom and member from rattling.

18. In combination, a railway truck transom, a bracket thereon, a brake beam guard, guide, or support member on said bracket and arranged to extend beneath a brake beam suspended from said transom, and an auxiliary supporting element depending from said bracket and extending beneath said member throughout part of its length.

19. In combination, a railway truck transom, a brake beam guard, guide, or support member fixedly mounted on said transom and arranged to extend beneath a brake beam suspended from said transom, and an auxiliary supporting element fixedly mounted on said transom and arranged to extend beneath said brake beam guard, guide, or support member throughout part of its length to reinforce said member when heavy loads are applied to the brake beam.

20. In combination, a railway truck transom, a bracket depending therefrom, a bar secured to said bracket and extending downwardly from said transom and then transversely of and away from said transom to form a brake beam guard, guide, or support member, and another bar secured to said bracket and extending beneath and following the curvature of said first mentioned bar, but spaced therefrom throughout part of its length to reinforce said first mentioned bar when heavy loads are applied to the brake beam.

21. In a railway truck, a side frame, an axle and wheels, a bolster at one side thereof, a member extending inwardly from said frame at the side of said axle and wheels opposite said bolster, a bracket depending from said member, and a brake beam guard, guide, or support element fixedly secured to and depending from said bracket and extending lengthwise of the truck toward said axle.

22. In a railway truck, a frame including spaced transverse members, and a brake beam guard, guide, or support element extending longitudinally of the truck between and carried by said members.

23. In a railway truck, a frame including a transom and a transverse end member, a wheel between said transom and end member, and an element extending between and carried by said transom and end member and forming a guard, guide or support for brake beams on each side of said wheel.

24. In a railway truck, an axle and wheels, a frame including spaced transverse members located on opposite sides of said axle, and a brake beam, guard, guide, or support element extending longitudinally of the truck between and carried by said members and extending under said axle.

In testimony whereof I hereunto affix my signature this 17th day of September, 1930.

EDWIN G. BUSSE.